(12) United States Patent
Sasaki

(10) Patent No.: US 9,234,771 B2
(45) Date of Patent: Jan. 12, 2016

(54) ROTARY ENCODER TO DETECT A CHANGE OF QUANTITY AND MEASURE ROTATION ANGLE

(75) Inventor: Koji Sasaki, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 455 days.

(21) Appl. No.: 12/903,467

(22) Filed: Oct. 13, 2010

(65) Prior Publication Data

US 2011/0227562 A1     Sep. 22, 2011

(30) Foreign Application Priority Data

Oct. 16, 2009   (JP) .................................. 2009-239261

(51) Int. Cl.
*G01B 7/30* (2006.01)
*G01D 5/245* (2006.01)

(52) U.S. Cl.
CPC ..................................... *G01D 5/2452* (2013.01)

(58) Field of Classification Search
CPC ............ G01B 7/30; G01B 7/02; G01B 7/023; G01B 7/04; G01B 7/046; G01B 7/14; G01B 7/305; G01B 7/31; G01B 7/312; G01D 5/2266; G01D 5/2275; G01D 5/2283; G01D 5/145; G01D 5/204; G01D 5/2046; G01D 5/2053; G01D 5/206; G01D 5/22; G01D 5/2208; G01D 5/2216; G01D 5/2225; G01D 5/2233; G01D 5/2241; G01D 5/225; G01D 5/2258; G01D 5/14; G01D 5/142; G01D 5/147; G01D 5/16; G01D 5/20; G01D 5/2006; G01D 5/2013; G01D 5/202; G01D 5/2026; G01D 5/2033; G01D 5/2451; G01D 5/2452; G01D 5/2454; G01D 5/2455; G01D 5/2457; G01D 5/2458; H01L 43/00; H01L 43/06; H01L 43/08; G01R 33/0094; G01R 15/20; G01R 15/202; G01R 15/205

USPC ............ 324/207.15, 207.16, 207.17, 207.25, 324/207.22

See application file for complete search history.

(56) References Cited

U.S. PATENT DOCUMENTS 5,796,248 A   8/1998  Weber
6,111,402 A   8/2000  Fischer
(Continued)

FOREIGN PATENT DOCUMENTS

CN        1900649       1/2007
CN      101358826       2/2009
(Continued)

OTHER PUBLICATIONS

Chinese Office Action and Search Report, dated Jan. 10, 2014, in counterpart Chinese Patent Application No. 201010577014.1, along with an English translation of the Office Action.
(Continued)

*Primary Examiner* — Jay Patidar
*Assistant Examiner* — David M. Schindler
(74) *Attorney, Agent, or Firm* — Greenblum & Bernstein, P.L.C.

(57) ABSTRACT

A guide detection type rotary encoder has first through fourth transmission windings, first through fourth reception windings, and first through fourth flux coupling bodies. The first and second transmission windings, the first and second reception windings, and first and second flux coupling bodies each form first and second angle detection tracks which generate an $N_1$ time and $N_2$ time cyclic change at one rotation of the first rotor. The third and fourth transmission windings, the third and fourth reception windings, and third and fourth flux coupling bodies each form third and fourth angle detection tracks which generate an $N_3$ time and $N_4$ time cyclic change at one rotation of the second rotor. $N_1$ and $N_2$ are different, and $N_3$ time and $N_4$ are different.

8 Claims, 9 Drawing Sheets

(56) References Cited

U.S. PATENT DOCUMENTS

| | | | |
|---|---|---|---|
| 8,159,215 B2* | 4/2012 | Kobayashi | 324/207.25 |
| 8,339,126 B2* | 12/2012 | Izak et al. | 324/207.25 |
| 2006/0250128 A1* | 11/2006 | Tahara et al. | 324/207.25 |
| 2007/0018658 A1* | 1/2007 | Hayashida et al. | 324/650 |
| 2009/0031578 A1* | 2/2009 | Suzuki et al. | 33/820 |
| 2010/0102803 A1* | 4/2010 | Kobayashi | 324/207.25 |
| 2013/0187639 A1* | 7/2013 | Sasaki | G01B 7/30 324/207.17 |

FOREIGN PATENT DOCUMENTS

| | | |
|---|---|---|
| EP | 1715298 | 10/2006 |
| EP | 1746382 | 1/2007 |
| JP | 10-213407 | 8/1998 |
| JP | 2002-116057 | 4/2002 |
| JP | 2006322927 | 11/2006 |
| JP | 2007-033083 | 2/2007 |
| JP | 2009-036718 | 2/2009 |

OTHER PUBLICATIONS

Chinese Office Action and Search Report, dated May 8, 2014, in counterpart Chinese Patent Application No. 201010577014.1, along with an English translation of the Office Action.

European Search Report from EPO dated Dec. 12, 2013, For application 10187651.4.

* cited by examiner

Comparative Example

ROTARY ENCODER TO DETECT A CHANGE OF QUANTITY AND MEASURE ROTATION ANGLE

CROSS-REFERENCE TO RELATED APPLICATIONS

The present application claims priority under 35 U.S.C. §119 of Japanese Application No. 2009-239261, filed on Oct. 16, 2009, the disclosure of which is expressly incorporated by reference herein in its entirety.

BACKGROUND OF THE INVENTION

1. Field of the Invention

The present invention is related to a rotary encoder which detects a change of a physical quantity involved in a rotation of a rotor with respect to a stator and measures a rotation angle of an object based on the change.

2. Description of Related Art

A guide detection type rotary encoder has a stator installing a transmission winding and a reception winding, and a rotor installing a flux coupling winding magnetically combined with the stator with the windings (for example, Related Art 1). For a rotary encoder, it is required to further miniaturize a pitch of a reception winding due to a demand for a miniaturization and high precision of a micrometer, etc. mounting the rotary encoder.

The rotary encoder containing two tracks also has the following problems. In other words, in order to improve an accuracy of the rotary encoder, it is necessary to improve the accuracy of the two tracks at the same time. Also, the allowance for an absolute position measurement over the whole length area is small. Furthermore, when the allowance is increased, the accuracy of the rotary encoder deteriorates.

[Related Art] Japanese Patent Laid-open Publication H10-213407

SUMMARY OF THE INVENTION

The present invention provides a rotary encoder which can measure an absolute position at high precision.

A rotary encoder according to an embodiment of the present invention has a stator, a first rotor which is engaged with a rotation shaft and rotates with the rotation shaft and opposes the stator in an axial direction, and a second rotor which is placed in the external circumference of the first rotor and can rotate with respect to the first rotor and opposes the stator in the axial direction. The rotary encoder also has a rotation transmitter which transmits the rotation of the rotation shaft and rotates the second rotor at a different speed from the first rotor. The rotary encoder further has first and second angle detection tracks which are coaxially formed with respect to the rotation shaft on the surface of the stator opposing the first rotor and on the surface of the first rotor opposing the stator. The first angle detection track is internal. The rotary encoder additionally has third and fourth angle detection tracks which are coaxially formed with respect to the rotation shaft on the surface of the stator opposing the second rotor and on the surface of the second rotor opposing the stator. The third angle detection track is internal. The first angle detection track generates an $N_1$ time cyclic change at one rotation of the first rotor. The second angle detection track generates an $N_2$ time cyclic change at one rotation of the first rotor. The third angle detection track generates an $N_3$ time cyclic change at one rotation of the second rotor. The fourth angle detection track generates an $N_4$ time cyclic change at one rotation of the second rotor. Further, $N_1$ is different from $N_2$, and $N_3$ is different from $N_4$.

The present invention enables a rotary encoder capable of measuring an absolute position at high precision.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The following describes one embodiment of a guide detection type rotary encoder according to the present invention with reference to the drawings.

First Embodiment

Figure 1:
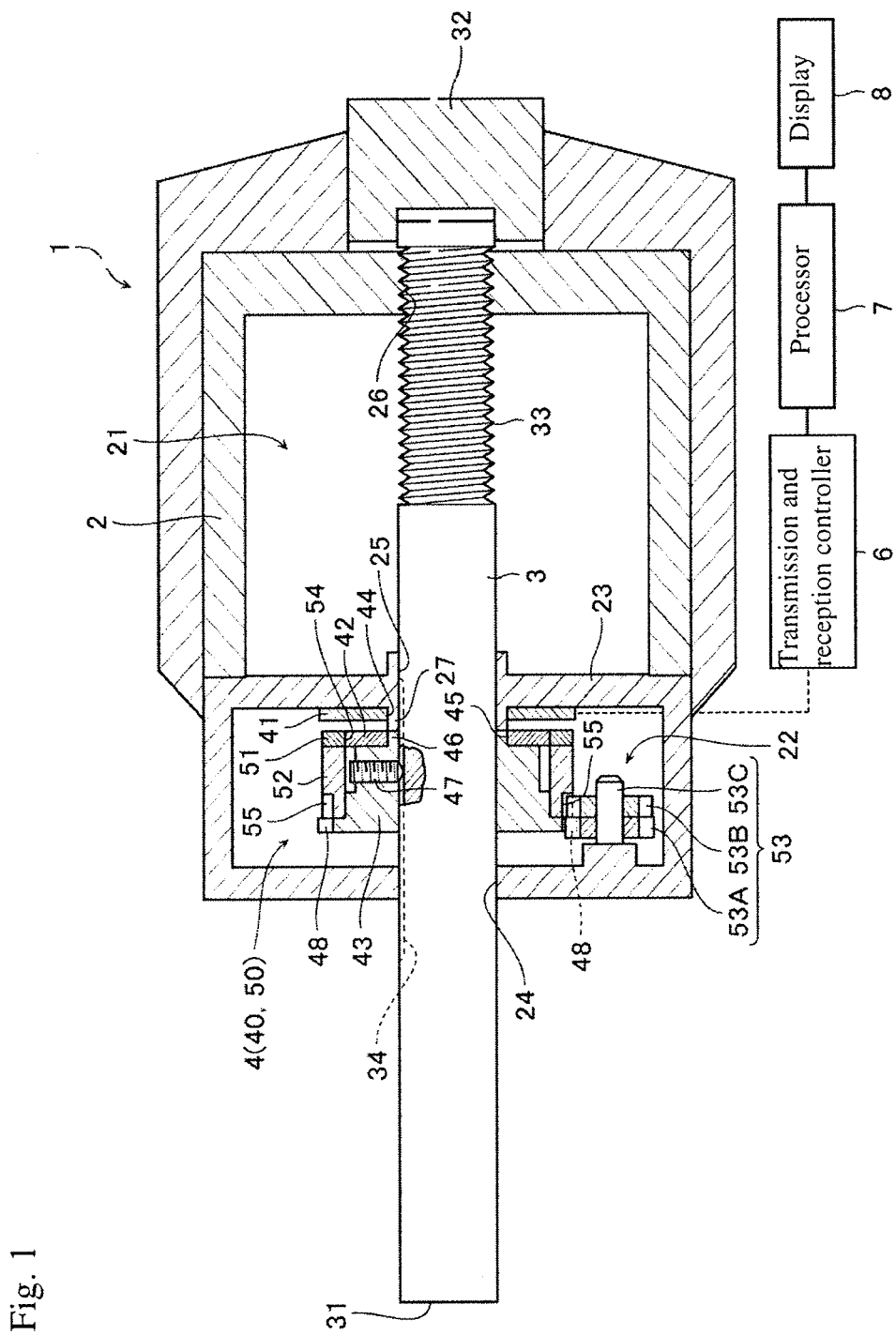
FIG. 1 is a cross-sectional view illustrating a micrometer head 1 according to a first embodiment.

An overall configuration of a micrometer head 1 mounting a guide detection type rotary encoder 4 according to a first embodiment is described with reference to FIG. 1. FIG. 1 is a cross-sectional view illustrating a micrometer head 1 according to the first embodiment.

A micrometer head 1 has a main body 2, a spindle 3 extending from the main body 2, and a guide detection type rotary encoder 4 installing the spindle 3 in the center. The micrometer head 1 also has a transmission and reception controller 6, a processor 7, and a display 8. The transmission and reception controller 6 controls transmission and reception between the controller and the guide detection type rotary encoder 4. The processor 7 performs an arithmetic processing based on a signal from the transmission and reception controller 6 (the guide detection type rotary encoder 4). The display 8 displays a processing result by the processor 7.

A main body 2 is formed in a substantially cylindrical shape and has storage spaces 21 and 22 inside. The storage spaces 21 and 22 are divided by an internal division plate 23. On the wall of the spindle tip end side of the substantially cylindrical main body 2 (left side in the drawing) and on the division plate 23, through holes 24 and 25 each of which the spindle 3 passes through are formed. On the proximal end of the main body 2 (right side in the drawing), an internal thread 26 is formed. The through holes 24 and 25 and the internal thread 26 are arranged on the same axis.

A spindle 3 is formed in a substantially columnar shape and has a contact surface 31 to a measured object (not illustrated) in the tip end and a knob 32 in the proximal end. The knob 32 rotates the spindle 3 externally. The spindle 3 penetrates the through holes 24 and 25 of the main body 2, and both ends of the spindle protrude from the main body 2. On the outer circumference of the spindle 3, a feed screw 33 is also formed and threaded with the internal thread 26 of the main body 2. With this configuration, the spindle 3 is advanced and retreated along inside the through holes 24 and 25 by the thread of the feed screw 33 and the internal thread 26 when the knob 32 is rotated. The feed screw 33 is formed for 40 rotations, for example, at a 0.5 mm pitch, so that the spindle 3 can be moved for 20 mm. On the substantial center of the spindle 3, a linear key groove 34 is formed in the axial direction.

Figure 2:
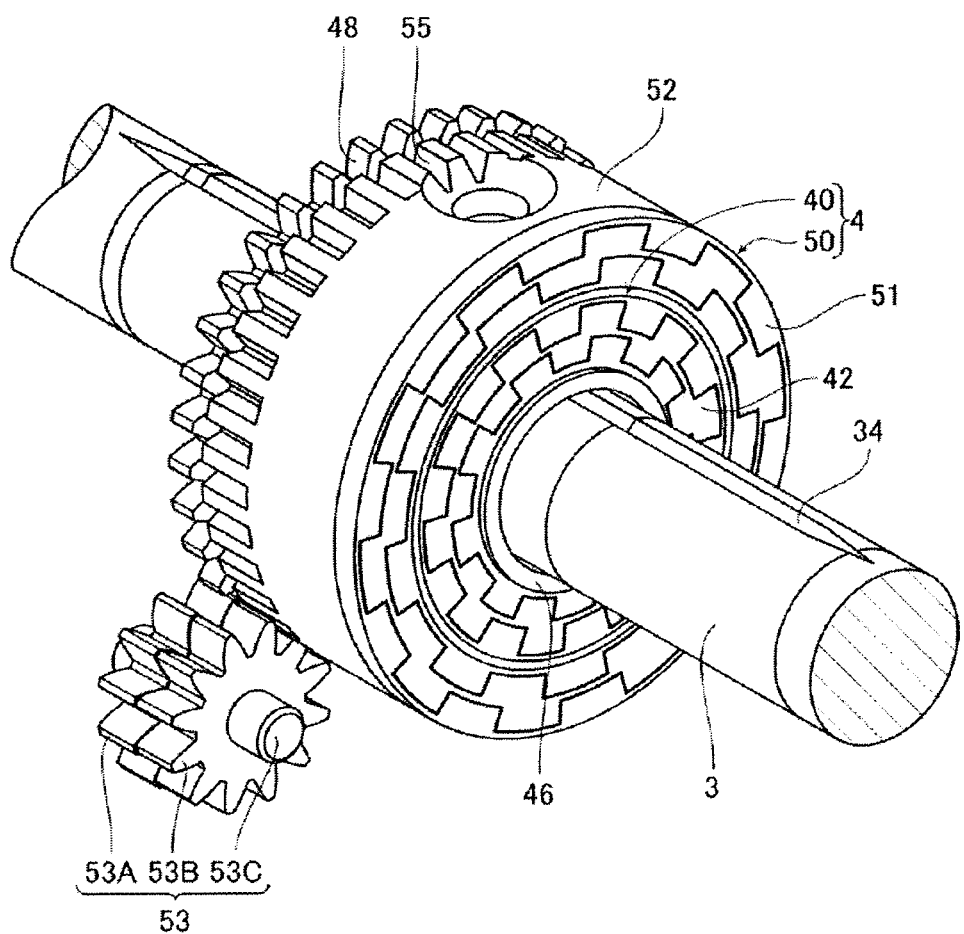
FIG. 2 is a perspective view of a guide detection type rotary encoder 4 according to the first embodiment.
Figure 3:
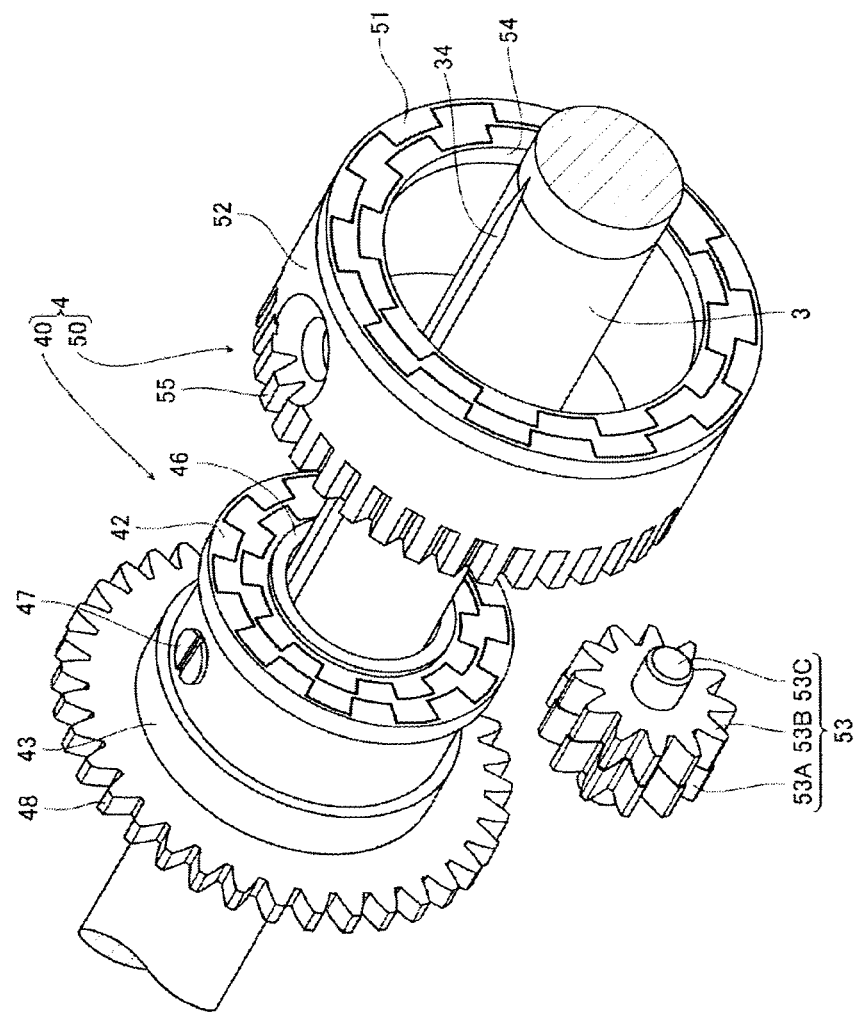
FIG. 3 is an exploded perspective view of the guide detection type rotary encoder 4 according to the first embodiment.

Next, a configuration of the guide detection type rotary encoder 4 is described with reference to FIG. 1 through FIG. 3. FIG. 2 is a perspective view of a guide detection type rotary encoder 4. FIG. 3 is an exploded perspective view of the guide detection type rotary encoder 4. As shown in FIG. 2 and FIG. 3, the guide detection type rotary encoder 4 is configured with a first rotary encoder 40 and a second rotary encoder 50 and is stored in the store space 22 of the main body 2.

The first rotary encoder 40 includes a stator 41, a first rotor 42, and a first rotary cylinder 43.

The stator 41 has a through hole 44 which a spindle 3 penetrates in a center of a circular plate and is fixed to the internal division plate 23. Specifically, the stator 41 is fit over a rim member 27 formed in a periphery of the through hole 25 of the internal division plate 23.

The first rotor 42 has a through hole 45 which the spindle 3 penetrates in a center of a circular plate and is placed in an axial direction opposing the stator 41 having a predetermined distance from the stator 41.

The first rotating cylinder 43 into which the spindle 3 is penetrated is provided closer towards the tip end of the spindle 3 than the stator 41 and is supported such that the first rotor 42 can be rotated around the axis of the spindle 3. In other words, on the end of the stator 41 side of the first rotating cylinder 43, a rotor support 46 is formed along the outer circumference of the spindle 3, and the first rotor 42 is fit over the rotor support 46.

The first rotating cylinder 43 also has a screw-like key 47 screwed into the center from the outer circumference. The tip end of the key 47 protrudes from the inner circumference of the first rotating cylinder 43 and is engaged with a key groove 34 in the outer circumference of the spindle 3. In other words, since a key 47 is engaged with a key groove 34 of the spindle 3, when the spindle is rotated, the first rotating cylinder 43 is arranged to be rotated synchronically with the spindle 3.

In addition, a first gear 48 is formed on the outer circumference of the first rotating cylinder 43. The gear 48 is provided on an end of the tip side of the spindle 3 in the first rotating cylinder 43 and has a larger outer diameter dimension than the outer circumferences of the other areas of the rotating cylinder 43. The number of gear teeth of the first gear 48 is set, for example, to be 40.

The second rotary encoder 50 includes the stator 41, a second rotor 51, a second rotating cylinder (support) 52, and a link-up gear 53.

The stator 41 is that of the first rotary encoder 40 and is a common component for the rotary encoders 40 and 50.

The second rotor 51 has a hole 54 which can place the first rotor 42 in a center of a circular plate and is provided surrounding the outer circumference of the first rotor 42. The second rotor 51 is also provided similar to the first rotor 42, in the axial direction opposing the stator 41 having a predetermined distance from the stator 41. In this way, the faces of each rotor 42 and 51 opposing the stator 41 form substantially the same plain surface.

The second rotating cylinder 52 into which the first rotating cylinder 43 (except the area of the first gear 48) is penetrated is supported by the first rotating cylinder 43. On the end of the stator 41 side of the second rotating cylinder 52, the second rotor 51 is attached. In this way, the second rotor 51 is supported rotatably around the axis of the spindle 3. In other words, the first and the second rotary encoders 40 and 50 have a double-layer cylindrical structure of having inner and outer sides.

Also, on the outer circumference of the second rotating cylinder 52, a second gear 55 is formed. The gear 55 is provided on the end of the tip side of the spindle 3 in the second rotating cylinder 52 and has substantially the same outer dimension as that of the gear 48 of the first rotating cylinder 43. The number of gear teeth of the second gear 55 is set, for example, to be 41; i.e., one tooth more compared with the number of gear teeth of the first gear 48.

The link-up gear 53 is rotatably supported by the main body 2, and engaged with both the first gear 48 and the second gear 55. In other words, the link-up gear 53 has a first link-up gear 53A which engages with the first gear 48, a second link-up gear 53B which engages with the second gear 55, and a shaft 53C which axially support these link-up gears 53A and 53B on the same axis. The number of gear teeth of the link-up gears 53A and 53B is set to be the same number; for example, 12. In the embodiment, the modules for one pair of the first gear 48 and the first link-up gear 53A correspond to each other; and the modules for the other pair of the second gear 55 and the second link-up gear 53B correspond to each other. Therefore, when the first rotating cylinder 43 rotates, the second rotating cylinder 52 rotates smoothly via the link-up gear 53.

When this occurs, depending on the difference in the number of gear teeth between the gear 48 and the gear 55, each rotor 42 and 51 rotates at a different speed. For instance, as shown in the embodiment, when the number of gear teeth of the gear 48 is set at 40, and that of the gear 55 is set at 41, the first rotor 42 rotates 40 times and the second rotor 51 rotates 39 times by the time the spindle 3 rotates 40 times within the range that the spindle 3 advances and retreats.

Additionally, the first rotary encoder 40 and the second rotary encoder 50 are arranged so that the absolute angle of each rotor 42 and 51 within one rotation can be detected. In other words, the stator 41 outputs a phase signal which refers to a change of one cycle per rotation of the first rotor 42. Then, because the first rotor 42 rotates synchronically with that of the spindle 3, the phase signal with respect to the first rotor 42 refers to a change of the first cycle of the present invention by one rotation of the spindle 3. For instance, the phase signal refers to a change of forty cycles while the spindle 3 rotates 40 times.

The stator 41 also outputs a phase signal which refers to a change of one cycle per rotation with respect to the second rotor 51. Then, since the second rotor 51 rotates 39 times by the time that the spindle 3 rotates 40 times, the phase signal with respect to the second rotor 51 refers to a change of 39 cycles by forty time rotations of the spindle 3.

Figure 4:
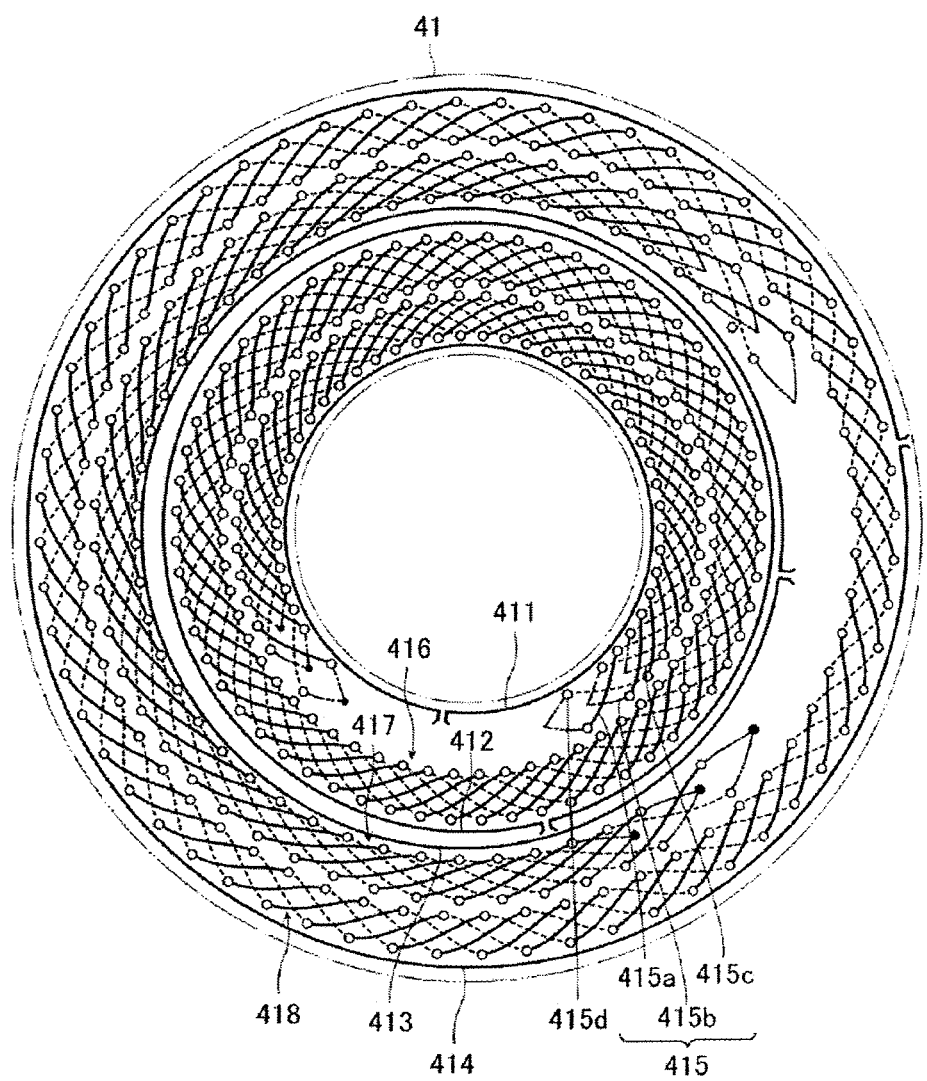
FIG. 4 illustrates a configuration of a top portion of a stator 41 according to the first embodiment.
Figure 5:
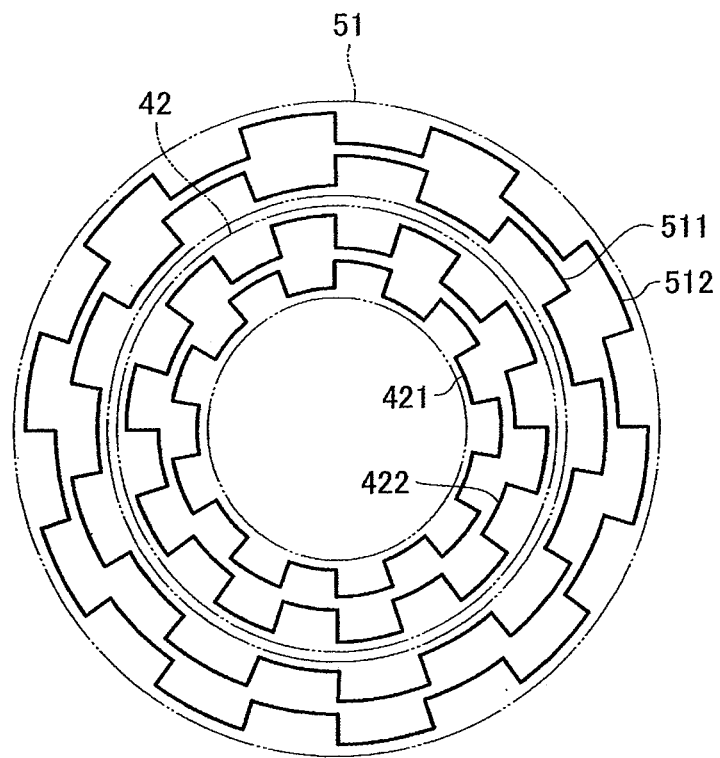
FIG. 5 illustrates a configuration of top portions of a first rotor 42 and a second rotor 51 according to the first embodiment.

Next, a detailed configuration of the stator 41, the first rotor 42, and the second rotor 51 is described with reference to FIG. 4 and FIG. 5. FIG. 4 illustrates a configuration of a top portion of a stator 41. FIG. 5 illustrates a configuration of top portions of a first rotor 42 and a second rotor 51.

As shown in FIG. 4, on the stator 41 opposing the first rotor 42 and the second rotor 51, a first transmission winding 411, a second transmission winding 412, a third transmission winding 413, and a fourth transmission winding 414 are provided coaxially to the spindle 3. The first transmission winding 411 is formed in a substantially circular shape having a first diameter from the spindle 3 (rotation shaft). The second transmission winding 412 is formed in a substantially circular shape having a second diameter which is larger than the first diameter from the spindle 3 (rotation shaft). The third transmission winding 413 is formed in a substantially circular shape having a third diameter which is larger than the second diameter from the spindle 3 (rotation shaft). The fourth transmission winding 414 is formed in a substantially circular shape having a fourth diameter which is larger than the third diameter from the spindle 3 (rotation shaft).

As shown in FIG. 4, on the stator 41 opposing the first rotor 42 and the second rotor 51, a first reception winding 415, a second reception winding 416, a third reception winding 417, and a fourth reception winding 418 are provided coaxially to the spindle 3. The first through fourth reception windings 415 through 418 are formed so that the distance from the spindle 3 (rotating shaft) can be changed periodically. The first reception winding 415 is formed between the first transmission winding 411 and the second transmission winding 412, and on the side of the first transmission winding 411. The second reception winding 416 is formed between the first transmission winding 411 and the second transmission winding 412, and on the side of the second transmission winding 412. The third reception winding 417 is formed between the third transmission winding 413 and the fourth transmission winding 414, and on the side of the third transmission winding 413. The fourth reception winding 418 is formed between the third transmission winding 413 and the fourth transmission winding 414, and on the side of the fourth transmission winding 414. The first reception winding 415 detects a flux generated by a below-described first flux coupling winding 421. The second reception winding 416 detects a flux generated by a below-described second flux coupling winding 422. The third reception winding 417 detects a flux generated by a below-described third flux coupling winding 511. The fourth reception winding 418 detects a flux generated by a below-described fourth flux coupling winding 512.

The first reception winding 415 is configured with three reception windings 415a through 415c having different phases in the rotation direction. The reception windings 415a through 415c are configured with an electric wire each arranged in a loop (diamond shape). The reception windings 415a through 415c are arranged to be above/below the substrate in the area crossing each other so that the crossing area does not short. They are also arranged to be insulated and isolated respectively by connecting the winding at a via hole 415d to each other. The second reception winding 416 through the fourth reception winding 418 are configured in a similar manner as the first reception winding 415.

As shown in FIG. 5, on the first rotor 42 opposing the stator 41, the first flux coupling winding 421 and the second flux coupling winding 422, which are a flux coupling body, are provided coaxially to the spindle 3. The first flux coupling winding 421 and the second flux coupling winding 422 are formed in a gear shape having concaves and convexes so that the distance from the spindle 3 (rotation shaft) may respectively change $N_1$ times and $N_2$ times periodically at one rotation of the first rotor 42. The first flux coupling winding 421 can be coupled in magnetic flux with the first transmission winding 411. The second flux coupling winding 422 can be coupled in magnetic flux with the second transmission winding 412.

The first flux coupling winding 421 is formed in a gear shape, for example, having nine piece ($N_1$) concaves and convexes. The second flux coupling winding 422 is formed in a gear shape, for example, having ten piece ($N_2$) concaves and convexes. In other words, the number of concaves and convexes of the second flux coupling winding 422 is different by one from that of the first flux coupling winding 421.

As shown in FIG. 5, on the second rotor 51 opposing the stator 41, the third flux coupling winding 511 and the fourth flux coupling winding 512, which are a flux coupling body, are provided coaxially to the spindle 3. The third flux coupling winding 511 and the fourth flux coupling winding 512 are formed having concaves and convexes so that the distance from the spindle 3 (rotation shaft) may respectively change $N_3$ times and $N_4$ times periodically at one rotation of the second rotor 51. The third flux coupling winding 511 can be coupled in magnetic flux with the third transmission winding 413. The fourth flux coupling winding 512 can be coupled in magnetic flux with the fourth transmission winding 414.

The third flux coupling winding 511 is formed in a gear shape, for example, having nine piece ($N_1$) concaves and convexes. The fourth flux coupling winding 512 is formed in a gear shape, for example, having ten piece ($N_2$) concaves and convexes. In other words, the number of concaves and convexes of the fourth flux coupling winding 512 is different by one from that of the third flux coupling winding 511.

Figure 6:
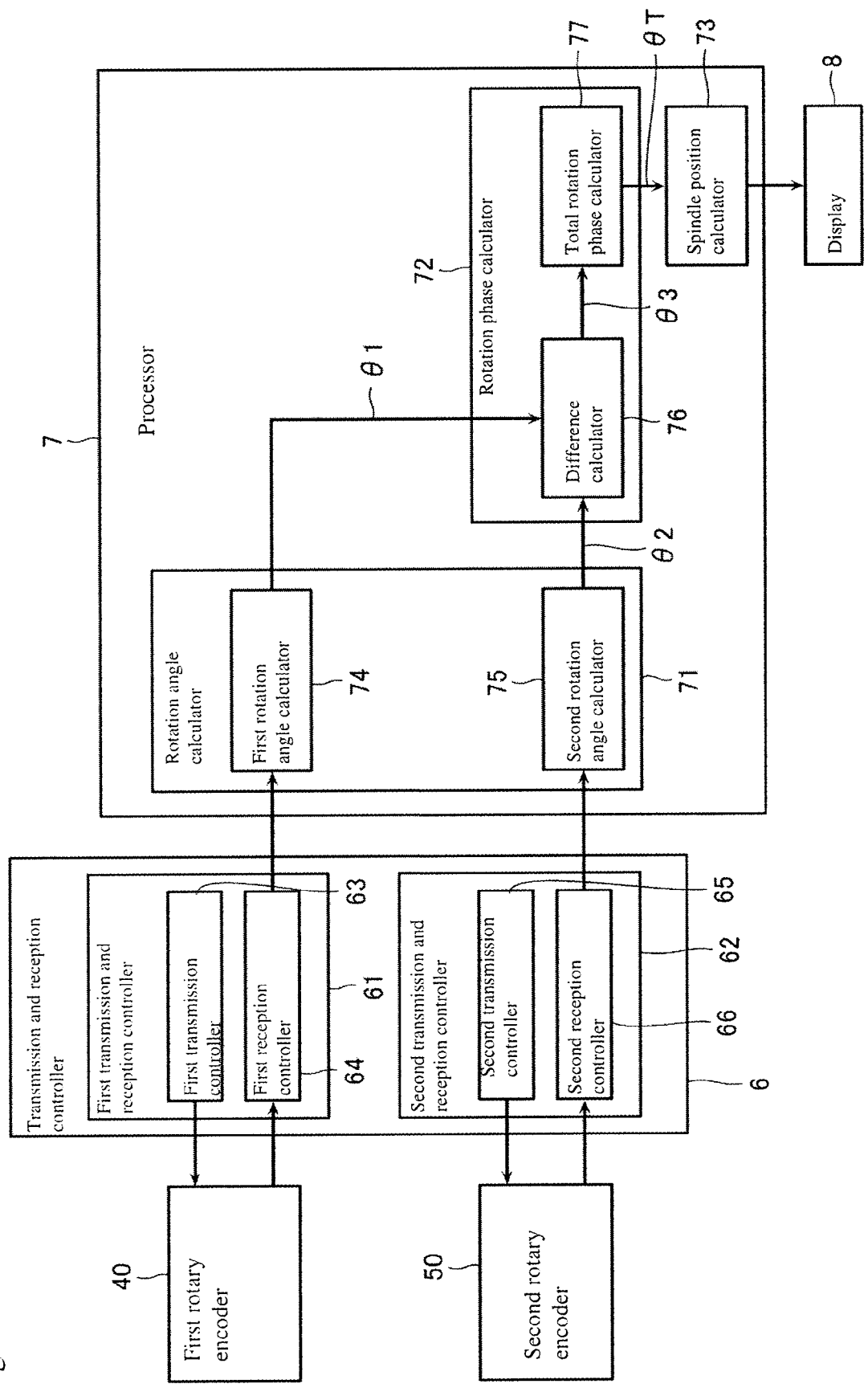
FIG. 6 is a block diagram illustrating a configuration of a transmission and reception controller 6 and a processor 7.

Next, a detailed configuration of a transmission and reception controller 6 and a processor 7 is described with reference to FIG. 6. FIG. 6 is a block diagram illustrating a configuration of a transmission and reception controller 6 and a processor 7.

First, the transmission and reception controller 6 is described. The transmission and reception controller 6 includes a first transmission and reception controller 61 which controls a transmission and reception of a signal with respect to the first rotary encoder 40, and a second transmission and reception controller 62 which controls a transmission and reception of a signal with respect to the second rotary encoder 50.

The first transmission and reception controller 61 includes a first transmission controller 63 and a first reception controller 64. The first transmission controller 63 transmits to the stator 41 a predetermined AC signal for the first rotor 42 (for the first transmission winding 411 and the second transmission winding 412). The first reception controller 64 receives a phase signal of the first rotor 42 from the stator 41 (the first reception winding 415 and the second reception winding 416). In this embodiment, the phase signal refers to a signal indicating a phase difference between a signal based on the first flux coupling winding 421 and a signal based on the second flux coupling winding 422.

Likewise, the second transmission and reception controller 62 includes a second transmission controller 65 and a second reception controller 66. The second transmission controller 65 transmits to the stator 41 a predetermined AC signal for the second rotor 51 (for the third transmission winding 413). The second reception controller 66 receives a phase signal of the second rotor 51 from the stator 41 (the third reception winding 417 and the fourth reception winding 418). In this embodiment, the phase signal refers to a signal indicating a phase difference between a signal based on the third flux coupling winding 511 and a signal based on the fourth flux coupling winding 512. The first reception controller 64 and the second reception controller 66 output to the processor 7 a phase signal of each rotor 42 and 51 received from the stator 41.

Next, the processor 7 is described. The processor 7 includes a rotation angle calculator 71, a rotation phase calculator 72, and a spindle position calculator 73. The rotation angle calculator 71 calculates each rotation angle θ1 and θ2 of the first rotor 42 and the second rotor 51. The rotation phase calculator 72 calculates a rotation phase of the spindle 3 based on the rotation angle θ1 and θ2 of each rotor 42 and 51 calculated in the rotation angle calculator 71. The spindle position calculator 73 calculates an absolute position of the spindle 3 based on the rotation phase of the spindle 3 calculated in the rotation phase calculator 72.

The rotation angle calculator 71 includes a first rotation angle calculator 74 and a second rotation angle calculator 75. The first rotation angle calculator 74 calculates a rotation angle θ1 of the first rotor 42 based on the phase signal from the first reception controller 64. The second rotation angle calculator 75 calculators a rotation angle θ2 of the second rotor 51 based on the phase signal from the second reception controller 66.

The first rotation angle calculator 74 calculates a rotation angle θ1 of the first rotor 42 as an absolute angle within one rotation (0°<θ1<360°) based on the phase signal from the first reception controller 64. In this embodiment, the phase signal from the first reception controller 64 does not generate the same phase within one rotation of the first rotor 42. In the first rotation angle calculator 74, the rotation angle θ1 of the first rotor 42 and the phase signal are preset to be memorized as a one-to-one relationship. Through this, according to the phase signal output from the first reception controller 64, the rotation angle θ1 of the first rotor 42 is primarily determined; the absolute angle within one rotation of the first rotor 42 is calculated.

Also, the second rotation angle calculator 75, in a similar manner as the first rotation angle calculator 74, calculates a rotation angle θ2 of the second rotor 51 as the absolute angle within one rotation based on the phase signal from the second reception controller 66.

The rotation phase calculator 72 includes a difference calculator 76 and a total rotation phase calculator 77. The difference calculator 76 calculates a difference θ3 of the rotation angles θ1 and θ2 of each rotor 42 and 51 calculated in the rotation angle calculator 71. The total rotation phase calculator 77 calculates a total rotation phase of the spindle 3 based on the difference θ3.

In the total rotation phase calculator 77, the difference θ3 and the total rotation phase of the spindle 3 are preset to be memorized as a one-to-one relationship. In other words, a difference of the rotation angles θ1 and θ2 of each rotor 42 and 51 is arranged to be one rotation by the time the spindle 3 rotates 40 times within the range that the spindle 3 advances and retreats. Therefore, the difference θ3 is calculated within the range of 0° to 360°; the total rotation phase θT of the spindle 3 is primarily calculated according to the difference θ3.

In the spindle position calculator 73, a move pitch (0.5 mm) per one rotation of the spindle 3 is preset to be memorized. Then, in the spindle position calculator 73, the total movement of the spindle 3, i.e., the absolute position of the spindle 3, is calculated by multiplying the move pitch (0.5 mm) and the total rotation phase θT. The display 8 displays, for example, the absolute position of the spindle 3 using a digital display.

Operation of the Micrometer Head 1

Next, an operation of the embodiment having this kind of configuration is described. When a spindle 3 is rotated using the knob 32, the spindle 3 is advanced or retreated in the axial direction by the thread of the internal thread 26 of the main body 2 and the feed screw 33 of the spindle 3. When the spindle 3 rotates, the first rotating cylinder 43 rotates with the spindle 3 by the key 47 engaged with the key groove 34 of the spindle 3.

When the first rotating cylinder 43 rotates, the first rotor 42 rotates with the first rotating cylinder 43. The rotation of the first rotor 42 is detected by the stator 41 and is transmitted to the first reception controller 64. Then, the rotation angle θ1 within one rotation of the first rotor 42 is calculated in the first rotation angle calculator 74.

In this embodiment, the first rotor 42 rotates synchronically with the spindle 3; a rotation angle θ1 within one rotation of the first rotor 42 refers to a rotation angle within one rotation of the spindle 3.

When the first rotating cylinder 43 rotates, the first link-up gear 53A of the link-up gear 53 engaged with the gear 48 of the first rotating cylinder 43 also rotates. Further, the gear 55 of the second rotating cylinder 52 that is engaged with the second link-up gear 53B of the link-up gear 53 also rotates as does the second rotor 51 along with the second rotating cylinder 52. A phase signal within one rotation of the second rotor 51 is detected by the stator 41 and transmitted to the second reception controller 66. Then, a rotation angle θ2 within one rotation of the second rotor 51 is calculated in the second rotation angle calculator 75.

Then, in the rotation phase calculator 72, a difference θ3 of the rotation angles θ1 and θ2 of each rotor 42 and 51 is calculated, and a total rotation phase θT of the spindle 3 is calculated based on the difference θ3. Finally, in the spindle position calculator 73, the absolute position of the spindle 3 is calculated based on the total rotation phase θT and the transmission pitch (0.5 mm) of the spindle 3 to be displayed in the display 8.

Figure 7:
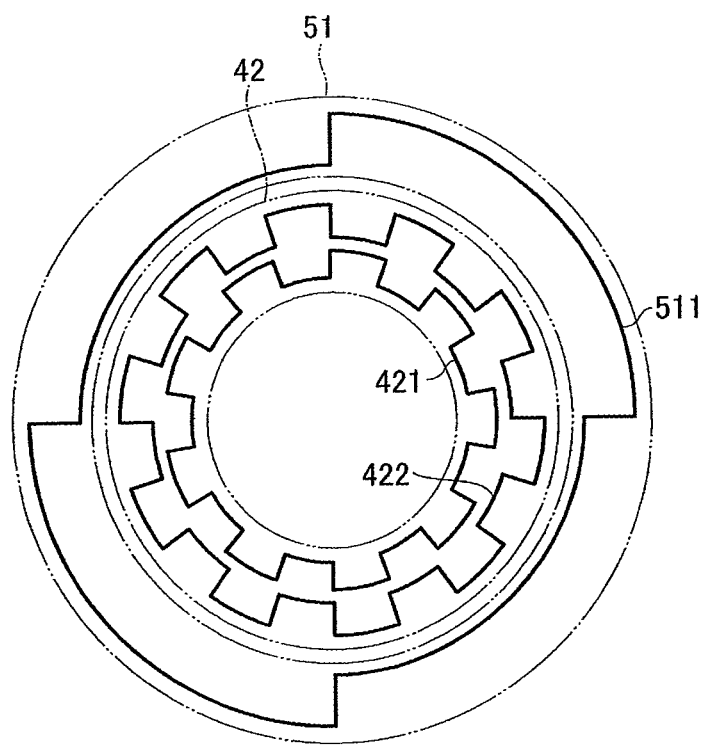
FIG. 7 illustrates a configuration of top portions of a first rotor 42 and a second rotor 51 in a comparative example.

An effect of the embodiment is described with reference of a comparative example according to FIG. 7. FIG. 7 illustrates a configuration of top portions of a first rotor 42 and a second rotor 51 in a comparative example. The comparative example, as shown in FIG. 7, differs from the embodiment in that it does not have a fourth flux coupling winding 512. The comparative example also does not have a fourth transmission winding 414 and a fourth reception winding 418, although this illustration is omitted. Additionally, in the comparative example, a third flux coupling winding 511 is formed in a gear shape having two piece ($N_3$) concaves and convexes.

For instance, in the above-described comparative example, in a case where 25 mm is lengthened at a screw pitch of 0.5 mm (a first rotor 42 rotates 50 times), strict accuracy is required as follows.

The range of use of the rotation angle of the second rotor 51 with respect to the first rotor 42 is 180° (=360°/2). The rotation angle of the second rotor 51 with respect to the first rotor 42 per one rotation of the first rotor 42 becomes a maximum of 180°/50=3.6°. The accuracy (including all errors such as mechanic errors) of the second rotary encoder 50 necessary to detect the rotation position needs to be half of that angle, which is 3.6°/2=1.8° or below. On the other hand, the accuracy of the second rotary encoder 50 (excluding mechanical errors) is about 180°/300=0.6°. Therefore, the allowance of the rotation accuracy of the mechanism part of the second rotor 51 (total allowance of component accuracy and assembly accuracy of the mechanism part of the second rotor 51) is within 1.8°−0.6°=1.2°; and thus, strict accuracy is required.

In addition, in the above-described comparative example, when the concaves and convexes having a gear shape of the third flux coupling winding 511 become even smaller (for example, one piece ($N_3$)) in order to expand the range of use of the rotation position of the first rotor 42 and the second rotor 51, accuracy of the second rotary encoder 50 worsens. On the other hand, when the concaves and convexes having a gear shape of the third flux coupling winding 511 becomes large, the range of use of the rotation angle of the second rotor 51 with respect to the first rotor 42 becomes smaller while accuracy of the second rotary encoder 50 (excluding a mechanic error) improves. Therefore, it becomes necessary to set the rotation accuracy of the mechanism part of the second rotary encoder 50 even more strictly.

In contrast, in the embodiment, two tracks having only one different pitch inside are formed and two more tracks having only one different pitch outside are formed. Therefore, an absolute position within one rotation can be detected with sufficient accuracy inside and outside. Besides, according to a configuration of the embodiment, unlike with that of the comparative example, component accuracy and assembly accuracy required for the mechanism part can be reduced; the manufacturing burden can be reduced.

Also, in the embodiment, the rotation angle of the second rotary encoder 50 with respect to the first rotary encoder 40 can be used for one rotation. Therefore, according the embodiment, the length range of the spindle 3 can be enlarged. Additionally, when a configuration of the embodiment is applied to a device having the same length range of the embodiment, component accuracy and assembly accuracy required for the mechanism part can be reduced.

Second Embodiment

Figure 8:
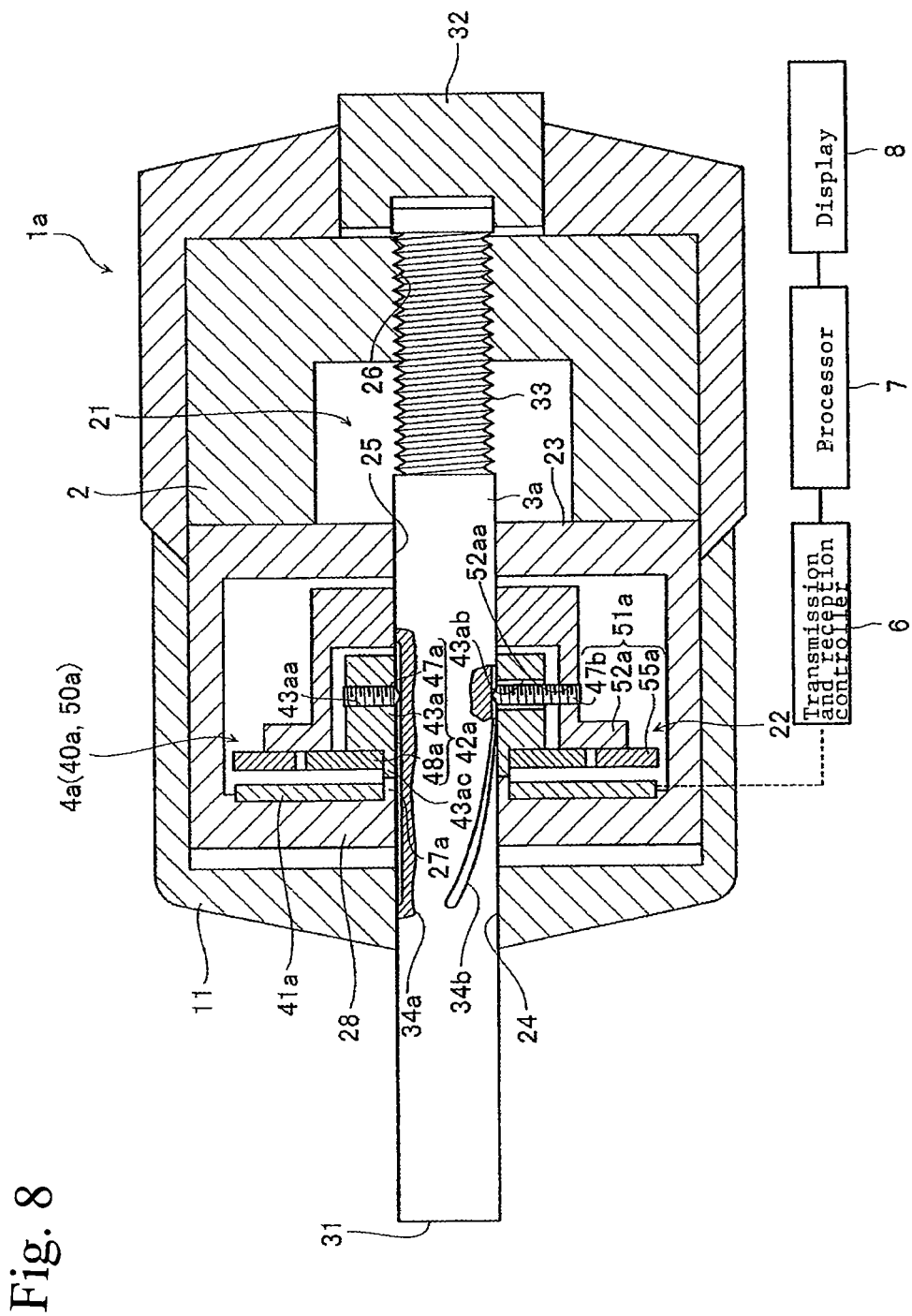
FIG. 8 is a cross-sectional view illustrating a micrometer head 1a according to a second embodiment.

Next, an overall configuration of a micrometer head 1a mounting a guide detection type rotary encoder 4a according to a second embodiment with reference to FIG. 8 is described. FIG. 8 is a cross-sectional view illustrating a micrometer head 1a according to the second embodiment. Also, in the second embodiment, the same numerals are assigned to the same configuration as that of the first embodiment and the descriptions are omitted.

As shown in FIG. 8, the micrometer head 1a has the spindle 3a, and the guide detection type rotary encoder 4a installing the spindle 3a in the center which are different from the first embodiment. Other than this, the micrometer head 1a has the same configuration as the first embodiment.

A spindle 3a is formed, in a similar manner as the first embodiment, in a substantially cylindrical shape and has the contact surface 31 to a measured object (not illustrated) in the tip end and the knob 32 in the proximal end.

In the central area of the spindle 3a, unlike the first embodiment, two key grooves 34a and 34b each having a different lead angle are provided. The first key groove 34a is provided parallel to the axis of the spindle 3a linearly. The second key groove 34b is provided helical to the spindle 3a. The positions of the beginning point and ending point of the first key groove 34a and the second key groove 34b are substantially consistent in the axial direction of the spindle 3a. In other words, the first key groove 34a and the second key groove 34b are formed in substantially the same range in the axial direction of the spindle 3a.

Also, when the spindle 3a advances and retreats, the key grooves 34a and 34b protrude externally from the main body 2 with the spindle 3a. However, an outer frame 11 is provided so that the key grooves 34a and 34b may not be exposed when the spindle 3a advances at the maximum externally.

Figure 9:
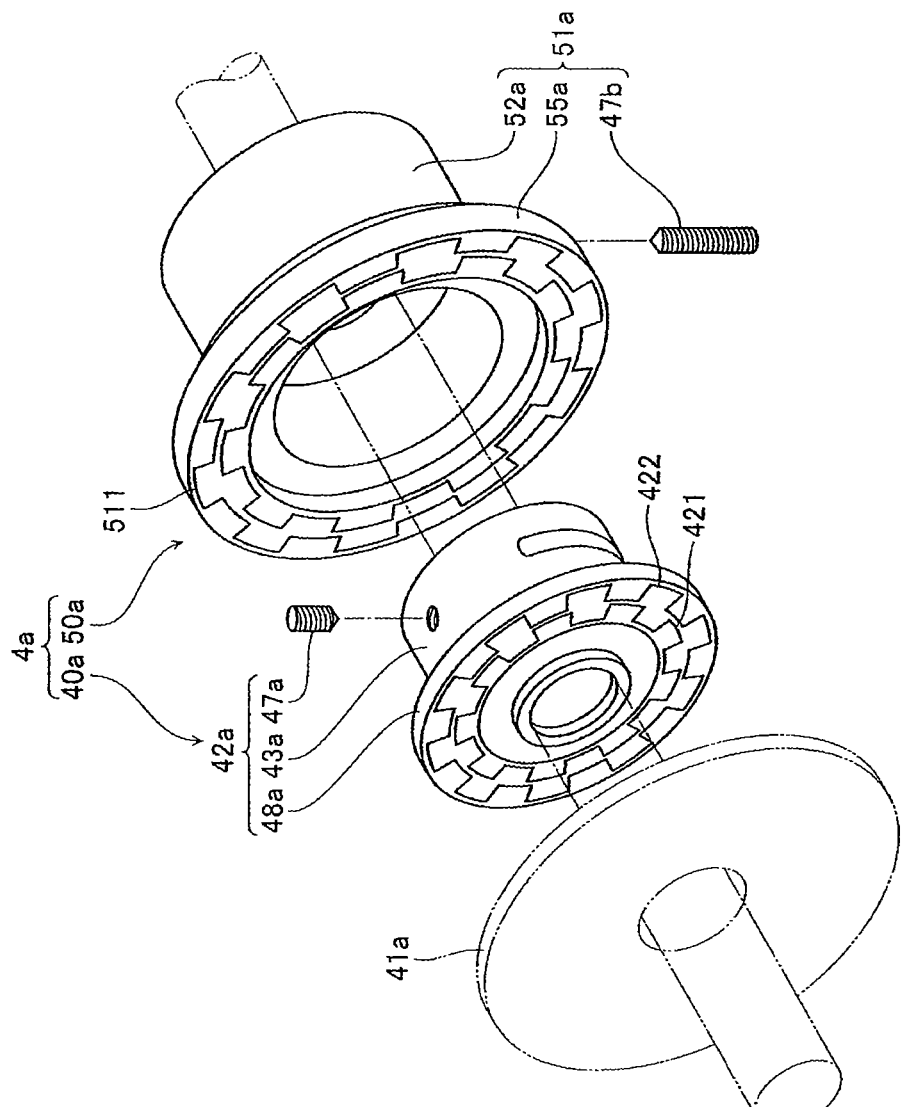
FIG. 9 is an exploded perspective view of the guide detection type rotary encoder 4a according to the second embodiment.

Next, a description of the guide detection type rotary encoder 4a follows. FIG. 9 is an exploded perspective view of the guide detection type rotary encoder 4a. As shown in FIG. 9, the guide detection type rotary encoder 4a is configured with a first rotary encoder 40a and a second rotary encoder 50a and is provided in a store space 22 of the main body 2.

The first rotary encoder 40a has a stator 41a and a key 47a engaged with the key groove 34a as well as a first rotor 42a to be rotated centering around the spindle 3a.

The stator 41a has the spindle 3a inserted and is fixed in the front end inner wall 28 of the store space 22.

The first rotor 42a is provided immediately outside the spindle 3a. The first rotor 42a is placed in the axial direction opposing the stator 41a having a predetermined distance from the stator 41a. The first rotor 42a includes a first rotor plate 48a which is rotated while opposing the stator 41a in pair with the stator 41a, a first rotating cylinder 43a which supports the rotation of the first rotor plate 48a centering the spindle 3a, and a first key 47a engaged with the first key groove 34a. The first rotor plate 48a is a circular platelet having a hole through which the spindle 3a passes.

The first rotating cylinder 43a is in a cylindrical shape that is fit over the spindle 3a and connected to the back surface of the first rotor plate 48a to support the rotation of the first rotor plate 48a. In the first rotating cylinder 43a, two holes 43aa and 43ab are provided which are formed to be penetrated perpendicular to the axis. The first key 47a is threaded into the first hole 43aa. Also, the second hole 43ab is formed in an elongated hole shape having a length in a circumferential direction of the first rotating cylinder 43a.

The second rotary encoder 50a has a stator 41a and a key 47b engaged with the key groove 34b as well as a second rotor 51a provided rotatably around the spindle 3a.

The second rotor 51a is provided outside the first rotor 42a so as to surround it. The second rotor 51a is placed in an axial direction opposing the stator 41a having a predetermined distance from the stator 41a. The second rotor 51a, similar to the first rotor 42a, includes a second rotor plate 55a which is rotated while opposing the stator 41a in pair with the stator 41a, a second rotating cylinder 52a which supports the rotation of the second rotor plate 55a centering the spindle 3a, and a second key 47b engaged with the second key groove 34b.

The second rotor plate 55a is an annular plate having an inner hole the size of which loosely fits the first rotor plate 48a inside. The second rotating cylinder 52a is connected to the back surface of the second rotor plate 55a and is in a cylindrical shape having a hole which loosely fits the first rotating cylinder 43a inside.

The second rotating cylinder 52a has a hole 52aa which is formed to be penetrated perpendicular to the axis. The second key 47b is threaded into the second hole 52aa. Also, the second key 47b passes through the second hole 43ab which has an elongated hole shape of the first rotating cylinder 43a and is engaged with the second key groove 34b.

Then, the second rotating cylinder 52a has a bearing portion 52ab which receives the spindle 3a on the opposite side from the stator 41a with the first rotor 42a in between. Also, in the spindle axis direction, the position of the second key 47b is substantially the same as that of the first key 47a provided on the first rotating cylinder 43a.

In addition, on the front end side inner wall 28 of the store space 22 fixing the stator 41a, the spindle bearing 27a is extended slightly towards the back end side compared with the stator 41a. The spindle bearing 43ac of the first rotating cylinder 43a is also extended slightly towards the side of the stator 41a compared with the first rotor plate 48a. Since the spindle bearing 43ac of the first rotating cylinder 43a touches the spindle bearing 27a of the main body 2, a gap is secured properly between the stator 41a and the first rotor plate 48a.

Furthermore, a coil spring (biasing unit) which is not illustrated is set between the second rotating cylinder 52a and the internal division plate 23. The second rotor 51a is arranged to bias towards the stator 41a side. With the first rotor 42a being pressed towards the inner wall of the second rotating cylinder 52a, the first rotor 42a is biased towards the stator 41a.

Operation of the Micrometer Head 1

Next, an operation of the micrometer head 1a according to the second embodiment including the above-described configuration is illustrated. When the spindle 3a is rotated using the knob 32, the spindle 3a is advanced and retreated in the axial direction by the thread of the internal thread 26 of the main body 2 and the feed screw 33 of the spindle 3a.

Also, when the spindle 3a is rotated, the first rotating cylinder 43a and the second rotating cylinder 52a are rotated along with the rotation of the spindle 3a as the first key 47a of the first rotating cylinder 43a and the second key 47b of the second rotating cylinder 52a are respectably engaged with a first key groove 34a and the second key groove 34b of the spindle 3a. When this occurs, since the first rotating cylinder 43a receives the spindle 3a by the spindle bearing 43ac, the first rotating cylinder 43a rotates on the basis of the spindle 3a. Further, since the second rotating cylinder 52a receives the spindle 3a by the bearing portion 622, the second rotating cylinder 52a also rotates on the basis of the spindle 3a.

Then, the first key groove 34a and the second key groove 34b have a different lead angle from each other; and thus, the first rotating cylinder 43a and the second rotating cylinder 52a are rotated per one rotation of the spindle 3a at a different rotating amount (rotation phase). When the first and second rotating cylinder 43a and 52a are rotated by the rotation of the spindle 3a, the first rotor plate 48a is rotated along with the first rotating cylinder 43a, and the second rotor plate 55a is rotated along with the second rotating cylinder 52a. In other words, in the second embodiment, the first rotor 42a rotates at a different rotation speed from that of the second rotor 51a in a similar manner as the first embodiment.

In the second embodiment, on the first rotor 42a opposing the stator 41, first and second flux coupling windings 421 and 422 are formed in a similar manner as the first embodiment. On the second rotor 51a opposing the stator 41, third and fourth flux coupling windings 511 and 512 are formed. On the stator 41a opposing the first and second rotors 42a and 51a, first through fourth transmission windings 411 through 414 and first through fourth reception windings 415 through 418 are formed.

A micrometer head 1a according to the second embodiment is configured substantially in a similar manner as the first embodiment, and thus it has the similar effect as the first embodiment.

Other Embodiments

As described above, one embodiment of the guide detection type rotary encoder according to the present invention is described. However, the present invention is not limited to what is explained in the above embodiment. Changes, additions and replacements may be made within the scope of the intent of the invention. For example, the first through third flux coupling bodies can be holes or concaves formed on an electrode and conductive plate instead of the first through fourth flux coupling windings 421, 422, 511, and 512.

Also, the above embodiment is intended to detect which rotations of the first rotor 42 based on the positional relation of the first rotor 42 and the second rotor 51. However, the present invention may be intended to detect which rotations of the second rotor 51 based on the positional relation of the first rotor 42 and the second rotor 51.

In addition, in the above embodiment, $N_1=N_3$, $N_2=N_4$ and $N_4-N_3=N_2-N_1=1$. However, it is also applicable that $N_1 \neq N_3$, $N_2 \neq N_4$, $N_4-N_3 \neq N_2-N_1 \neq 1$, and $N_1=N_4$, and $N_2=N_3$.

Furthermore, the above embodiment is using an electromagnetic guidance type rotary encoder. However, the present invention is also applicable to a capacitor ionization type or photoelectric rotary encoder.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A rotary encoder, comprising:
a stator;
a first rotor affixed to a rotation shaft and rotatable with the rotation shaft, the first rotor opposing the stator in an axial direction of the shaft;
a second rotor positioned about an external circumference of the first rotor and rotatable relative to the first rotor, the second rotor opposing the stator in the axial direction;
a rotation transmitter configured to rotate the rotation shaft;
a gear configured to rotate the second rotor at a different speed than the first rotor;
each of first and second angle detectors being coaxially positioned about the rotation shaft on a surface of the stator opposing the first rotor and on a surface of the first rotor opposing the stator, wherein the first angle detector is radially inside of the second angle detector; and
each of third and fourth angle detectors coaxially positioned about the rotation shaft on a surface of the stator opposing the second rotor and on a surface of the second rotor opposing the stator, wherein the third angle detector is entirely radially inside of the fourth angle detector, wherein:
each of the first, second, third, and fourth angle detectors comprises a flux coupling winding with a plurality of protrusions and recesses;

the first angle detector detects, at a reference position, $N_1$ number of times a protrusion and a recess of the flux coupling winding of the first angle detector changes with one another in one rotation of the first rotor;

the second angle detector detects, at a reference position, $N_2$ number of times a protrusion and a recess of the flux coupling winding of the second angle detector changes with one another in one rotation of the first rotor;

the third angle detector detects, at a reference position, $N_3$ number of times a protrusion and a recess of the flux coupling winding of the third angle detector changes with one another in one rotation of the second rotor;

the fourth angle detector detects, at a reference position, $N_4$ number of times a protrusion and a recess of the flux coupling winding of the fourth angle detector changes with one another in one rotation of the second rotor;

$N_1$ is different from $N_2$, and $N_3$ is different from $N_4$; and $N_1$ is smaller than $N_4$.

2. The rotary encoder according to claim 1, wherein:
the first angle detector comprises:
- a first transmission winding coaxially positioned about the rotation shaft on the surface of the stator opposing the first rotor; and
- a first reception winding coaxially positioned about the rotation shaft on the surface of the stator opposing the first rotor, in association with the first transmission winding,
- wherein the flux coupling winding of the first angle detector is coaxially positioned about the rotation shaft on the surface of the first rotor opposing the stator, and magnetically combines the first transmission winding and the first reception winding;

the second angle detector comprising:
- a second transmission winding coaxially positioned about the rotation shaft on the surface of the stator opposing the first rotor and positioned radially outside the first transmission winding; and
- a second reception winding coaxially positioned about the rotation shaft on the surface of the stator opposing the first rotor, in association with the second transmission winding and positioned radially outside the first transmission winding,
- wherein the flux coupling winding of the second angle detector is coaxially positioned about the rotation shaft on the surface of the first rotor opposing the stator, and magnetically combines the second transmission winding and the second reception winding;

the third angle detector comprising:
- a third transmission winding coaxially positioned about the rotation shaft on the surface of the stator opposing the second rotor and positioned radially outside the second transmission winding; and
- a third reception winding coaxially positioned about the rotation shaft on the surface of the stator opposing the second rotor, in association with the third transmission winding, and positioned radially outside the second transmission winding,
- wherein the flux coupling winding of the third angle detector is coaxially positioned about the rotation shaft on the surface of the second rotor opposing the stator, and magnetically combines the third transmission winding and the third reception winding; and the fourth angle detector comprising:
- a fourth transmission winding coaxially positioned about the rotation shaft on the surface of the stator opposing the second rotor and positioned radially outside the third transmission winding; and
- a fourth reception winding coaxially positioned about the rotation shaft on the surface of the stator opposing the second rotor, in association with the fourth transmission winding and positioned radially outside the third transmission winding,
- wherein the flux coupling winding of the fourth angle detector is coaxially positioned about the rotation shaft on the surface of the second rotor opposing the stator, and magnetically combines the fourth transmission winding and the fourth reception winding.

3. A rotary encoder, comprising:
a stator;
a first rotor affixed to a rotation shaft and rotatable with the rotation shaft, the first rotor opposing the stator in an axial direction of the shaft;
a second rotor positioned about an external circumference of the first rotor and rotatable relative to the first rotor, the second rotor opposing the stator in the axial direction;
a rotation transmitter configured to rotate the rotation shaft;
a gear configured to rotate the second rotor at a different speed than the first rotor;
each of first and second angle detectors being coaxially positioned about the rotation shaft on a surface of the stator opposing the first rotor and on a surface of the first rotor opposing the stator, wherein the first angle detector is radially inside of the second angle detector; and
each of third and fourth angle detectors coaxially positioned about the rotation shaft on a surface of the stator opposing the second rotor and on a surface of the second rotor opposing the stator, wherein the third angle detector is entirely radially inside of the fourth angle detector, wherein:
each of the first, second, third, and fourth angle detectors comprises a flux coupling winding with a plurality of protrusions and recesses;
the first angle detector detects, at a reference position, $N_1$ number of times a protrusion and a recess of the flux coupling winding of the first angle detector changes with one another in one rotation of the first rotor;
the second angle detector detects, at a reference position, $N_2$ number of times a protrusion and a recess of the flux coupling winding of the second angle detector changes with one another in one rotation of the first rotor;
the third angle detector detects, at a reference position, $N_3$ number of times a protrusion and a recess of the flux coupling winding of the third angle detector changes with one another in one rotation of the second rotor;
the fourth angle detector detects, at a reference position, $N_4$ number of times a protrusion and a recess of the flux coupling winding of the fourth angle detector changes with one another in one rotation of the second rotor;
$N_1$ is different from $N_2$, and $N_3$ is different from $N_4$; and $N_1$ is smaller than $N_4$,
wherein the difference between $N_1$ and $N_2$ is "1" and between $N_3$ and $N_4$ is "1".

4. A rotary encoder, comprising:
a stator;
a first rotor affixed to a rotation shaft and rotatable with the rotation shaft, the first rotor opposing the stator in an axial direction of the shaft;
a second rotor positioned about an external circumference of the first rotor and rotatable relative to the first rotor, the second rotor opposing the stator in the axial direction;
a rotation transmitter configured to rotate the rotation shaft;
a gear configured to rotate the second rotor at a different speed than the first rotor;
each of first and second angle detectors being coaxially positioned about the rotation shaft on a surface of the stator opposing the first rotor and on a surface of the first rotor opposing the stator, wherein the first angle detector is radially inside of the second angle detector; and each of third and fourth angle detectors coaxially positioned about the rotation shaft on a surface of the stator opposing the second rotor and on a surface of the second rotor opposing the stator, wherein the third angle detector is entirely radially inside of the fourth angle detector, wherein:

the first angle detector comprises:

a first transmission winding coaxially positioned about the rotation shaft on the surface of the stator opposing the first rotor;

a first reception winding coaxially positioned about the rotation shaft on the surface of the stator opposing the first rotor, in association with the first transmission winding; and a first flux coupling winding coaxially positioned about the rotation shaft on the surface of the first rotor opposing the stator and magnetically combining the first transmission winding and the first reception winding, the first flux coupling winding having protrusions and recesses;

the second angle detector comprising:

a second transmission winding coaxially positioned about the rotation shaft on the surface of the stator opposing the first rotor and positioned radially outside the first transmission winding;

a second reception winding coaxially positioned about the rotation shaft on the surface of the stator opposing the first rotor, in association with the second transmission winding and positioned radially outside the first transmission winding; and a second flux coupling winding coaxially positioned about the rotation shaft on the surface of the first rotor opposing the stator, and magnetically combining the second transmission winding and the second reception winding, and positioned radially outside the first flux coupling winding, the second flux coupling winding having protrusions and recesses;

the third angle detector comprising:

a third transmission winding coaxially positioned about the rotation shaft on the surface of the stator opposing the second rotor and positioned radially outside the second transmission winding;

a third reception winding coaxially positioned about the rotation shaft on the surface of the stator opposing the second rotor, in association with the third transmission winding, and positioned radially outside the second transmission winding; and a third flux coupling winding coaxially positioned about the rotation shaft on the surface of the second rotor opposing the stator, magnetically combining the third transmission winding and the third reception winding, and positioned radially outside the second flux coupling winding, the third flux coupling winding having protrusions and recesses; and the fourth angle detector comprising:

a fourth transmission winding coaxially positioned about the rotation shaft on the surface of the stator opposing the second rotor and positioned radially outside the third transmission winding;

a fourth reception winding coaxially positioned about the rotation shaft on the surface of the stator opposing the second rotor, in association with the fourth transmission winding and positioned radially outside the third transmission winding; and a fourth flux coupling winding coaxially positioned about the rotation shaft on the surface of the second rotor opposing the stator, magnetically combining the fourth transmission winding and the fourth reception winding, and positioned radially outside the third flux coupling winding, the fourth flux coupling winding having protrusions and recesses, and wherein:

the first angle detector detects, at a reference position, $N_1$ number of times a protrusion and a recess of the first flux coupling winding changes with one another in one rotation of the first rotor;

the second angle detector detects, at a reference position, $N_2$ number of times a protrusion and a recess of the second flux coupling winding changes with one another in one rotation of the first rotor;

the third angle detector detects, at a reference position, $N_3$ number of times a protrusion and a recess of the third flux coupling winding changes with one another in one rotation of the second rotor;

the fourth angle detector detects, at a reference position, $N_4$ number of times a protrusion and a recess of the fourth flux coupling winding changes with one another in one rotation of the second rotor; and $N_1$ is different from $N_2$, and $N_3$ is different from $N_4$, wherein the difference between $N_1$ and $N_2$ is "1" and between $N_3$ and $N_4$ is "1".

5. The rotary encoder according to claim 1, wherein $N_1=N_3$ and $N_2=N_4$.

6. The rotary encoder according to claim 2, wherein $N_1=N_3$ and $N_2=N_4$.

7. The rotary encoder according to claim 3, wherein $N_1=N_3$ and $N_2=N_4$.

8. The rotary encoder according to claim 4, wherein $N_1=N_3$ and $N_2=N_4$.

* * * * *